US010402815B2

United States Patent
Sharma et al.

(10) Patent No.: US 10,402,815 B2
(45) Date of Patent: Sep. 3, 2019

(54) METHOD FOR USING BARCODES AND MOBILE DEVICES TO CONDUCT PAYMENT TRANSACTIONS

(71) Applicant: VISA INTERNATIONAL SERVICE ASSOCIATION, San Francisco, CA (US)

(72) Inventors: Pankaj Sharma, Singapore (SG); Vikram Modi, Lafayette, CA (US); Shantnu Singh, Singapore (SG)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/102,327

(22) Filed: Aug. 13, 2018

(65) Prior Publication Data
US 2018/0349884 A1 Dec. 6, 2018

Related U.S. Application Data

(63) Continuation of application No. 14/860,342, filed on Sep. 21, 2015, now Pat. No. 10,078,832, which is a
(Continued)

(51) Int. Cl.
*G06Q 20/32* (2012.01)
*G06Q 20/34* (2012.01)

(52) U.S. Cl.
CPC ....... *G06Q 20/3276* (2013.01); *G06Q 20/346* (2013.01)

(58) Field of Classification Search
USPC ........................................................ 235/488
See application file for complete search history.

(56) References Cited

U.S. PATENT DOCUMENTS 5,237,164 A 8/1993 Takada
5,613,012 A 3/1997 Hoffman et al.
(Continued)

FOREIGN PATENT DOCUMENTS

EP 2156397 A1 2/2010
WO 2001035304 A1 5/2001
(Continued)

OTHER PUBLICATIONS

Zhao, J., et al., "Yet Another Simple Internet Electronic Payment System," Proc. of the IFIP 1996 World Conference—Mobile Communications, Canberra, Australia, Sep. 1996, pp. 1-8.
(Continued)

*Primary Examiner* — Michael G Lee
*Assistant Examiner* — David Tardif
(74) *Attorney, Agent, or Firm* — Kilpatrick Townsend & Stockton LLP

(57) ABSTRACT

Embodiments of the invention facilitate payment transactions by integrating the image capture and image processing capabilities of certain mobile devices with the card-based payment transaction infrastructure. In some embodiments, a camera contained in a mobile device is used to capture an image of a barcode that is visible on the surface of a substrate. The barcode may represent or otherwise encode one or more of payment account data, consumer authentication data, consumer profile data, or other relevant information. In some embodiments, the captured image may be processed by the mobile device to extract the payment account data, authentication data, or other relevant data. This data may then be communicated to a data processing element that is connected to, or forms part of, a payment processing network in order to conduct the desired payment transaction.

20 Claims, 12 Drawing Sheets

Related U.S. Application Data continuation of application No. 13/594,433, filed on Aug. 24, 2012, now Pat. No. 9,165,294.

(60) Provisional application No. 61/526,969, filed on Aug. 24, 2011.

(56) References Cited

U.S. PATENT DOCUMENTS

| | | |
|---|---|---|
| 5,781,438 A | 7/1998 | Lee et al. |
| 5,883,810 A | 3/1999 | Franklin et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,202,933 B1 | 3/2001 | Poore et al. |
| 6,227,447 B1 | 5/2001 | Campisano |
| 6,236,981 B1 | 5/2001 | Hill |
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,225,156 B2 | 5/2007 | Fisher |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| 7,387,250 B2 | 6/2008 | Muni |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,477,780 B2 | 1/2009 | Boncyk et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,634,295 B2 | 12/2009 | Hayaashi et al. |
| 7,650,314 B1 | 1/2010 | Saunders |
| 7,680,702 B1 | 3/2010 | Oakes |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,810,720 B2 | 10/2010 | Lovett |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Newton |
| 7,844,550 B2 | 11/2010 | Walker et al. |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,878,400 B2 | 2/2011 | Harris |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,922,082 B2 | 4/2011 | Muscato |
| 7,931,195 B2 | 4/2011 | Mullen |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,171,525 B1 | 5/2012 | Pelly et al. |
| 8,196,813 B2 | 6/2012 | Vadhri |
| 8,205,791 B2 | 6/2012 | Randazza et al. |
| 8,224,702 B2 | 7/2012 | Mengerink et al. |
| 8,225,385 B2 | 7/2012 | Chow et al. |
| 8,265,993 B2 | 9/2012 | Chien et al. |
| 8,280,777 B2 | 10/2012 | Mengerink et al. |
| 8,328,095 B2 | 12/2012 | Oder, II et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,478 B2 | 8/2013 | Saunders et al. |
| 8,510,816 B2 | 8/2013 | Quach et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |

(56) References Cited

U.S. PATENT DOCUMENTS

| | | |
|---|---|---|
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,578,176 B2 | 11/2013 | Mattsson |
| 8,583,494 B2 | 11/2013 | Fisher |
| 8,584,251 B2 | 11/2013 | Mcguire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,887,308 B2 | 11/2014 | Grecia |
| 9,792,599 B2 * | 10/2017 | Kelly, III .............. G07G 5/00 |
| 9,943,761 B2 * | 4/2018 | Zouiten .............. A63F 13/12 |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0069165 A1 | 6/2002 | O'Neil |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028451 A1 | 2/2003 | Ananian |
| 2003/0028481 A1 | 2/2003 | Flitcroft et al. |
| 2003/0130955 A1 | 7/2003 | Hawthorne |
| 2003/0182207 A1 | 9/2003 | Skinner |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0220326 A1 | 10/2005 | Sim |
| 2005/0246293 A1 | 11/2005 | Ong |
| 2005/0254714 A1 | 11/2005 | Anne |
| 2005/0269401 A1 | 12/2005 | Spitzer et al. |
| 2005/0269402 A1 | 12/2005 | Spitzer et al. |
| 2006/0006224 A1 | 1/2006 | Modi |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0124211 A1 | 5/2007 | Smith |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0147883 A1 | 6/2008 | Philyaw |
| 2008/0195536 A1 | 8/2008 | Karns |
| 2008/0201264 A1 | 8/2008 | Brown et al. |
| 2008/0201265 A1 | 8/2008 | Newton |
| 2008/0210754 A1 | 9/2008 | Lovett |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0112768 A1 | 4/2009 | Hammad |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0234773 A1 | 9/2009 | Hasson |
| 2009/0248583 A1 | 10/2009 | Chhabra |
| 2009/0254485 A1 | 10/2009 | Baentsch |
| 2009/0276347 A1 | 11/2009 | Kargman |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0009663 A1 | 1/2010 | Chang |
| 2010/0082466 A1 | 4/2010 | Carlson et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0155470 A1 | 6/2010 | Woronec |
| 2010/0161433 A1 | 6/2010 | White |
| 2010/0185545 A1 | 7/2010 | Royyuru et al. |
| 2010/0210287 A1 | 8/2010 | De Vries et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0099057 A1 | 4/2011 | Tenyer |

(56) References Cited

U.S. PATENT DOCUMENTS

| | | |
|---|---|---|
| 2011/0125597 A1 | 5/2011 | Oder, II et al. |
| 2011/0153437 A1 | 6/2011 | Archer et al. |
| 2011/0154466 A1 | 6/2011 | Harper et al. |
| 2011/0161233 A1 | 6/2011 | Tieken |
| 2011/0191244 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0251910 A1* | 10/2011 | Dimmick ............... G06Q 20/12 705/17 |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0028609 A1 | 2/2012 | Hruska |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0099780 A1 | 4/2012 | Smith et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143767 A1 | 6/2012 | Abadir |
| 2012/0143772 A1 | 6/2012 | Abadir |
| 2012/0158580 A1 | 6/2012 | Eram et al. |
| 2012/0158583 A1* | 6/2012 | Evers ................ G06Q 20/102 705/40 |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0019098 A1 | 1/2013 | Gupta et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder ("JD"), II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191284 A1 | 7/2013 | Carlson et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212666 A1 | 8/2013 | Mattsson et al. |
| 2013/0218698 A1 | 8/2013 | Moon et al. |
| 2013/0226813 A1 | 8/2013 | Voltz |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | Von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |

FOREIGN PATENT DOCUMENTS

| | | |
|---|---|---|
| WO | 2001035304 A9 | 5/2001 |
| WO | 2003/023674 A1 | 3/2003 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

* cited by examiner

METHOD FOR USING BARCODES AND MOBILE DEVICES TO CONDUCT PAYMENT TRANSACTIONS

CROSS-REFERENCES TO RELATED APPLICATIONS

The present application is a continuation application of U.S. patent application Ser. No. 14/860,342, filed Sep. 21, 2015 which is a continuation of U.S. patent application Ser. No. 13/594,433, filed on Aug. 24, 2012, which is a non-provisional application of and claims priority to U.S. Provisional Application No. 61/526,969, filed on Aug. 24, 2011, the entire contents of all of which are herein incorporated by reference for all purposes.

BACKGROUND

Embodiments of the invention are directed to systems, apparatuses and methods for conducting payment transactions and processing data related to such transactions.

Conventional card present payment transactions often begin with a user taking a payment card, and then swiping the payment card in a payment card terminal to initiate a transaction. Such transactions may not be particularly secure if an unauthorized person has somehow obtained the payment card.

Conventional card not present payment transactions often begin with a user taking a payment card, and then inputting his card number into a checkout page on a Web site. Such transactions may also not be particularly secure, if the information on the card is somehow obtained by an unauthorized user. Further, the need to manually enter data into the checkout page is time consuming and inconvenient.

Embodiments of the invention address these and other problems, individually and collectively.

SUMMARY

Embodiments of the invention are directed to systems, apparatuses and methods that can utilize mobile devices (e.g., smart phones) and physical payment tokens with two dimensional barcodes to conduct payment transactions.

Consumer payment devices are used to conduct transactions to pay for goods or services by people every day and all over the world. Some common payment devices are credit cards and debit cards. One advantage of using such payment devices is that the transaction processing infrastructure has been developed and implemented based on using these types of payment devices so that the process of initiating, authorizing, settling, and clearing a payment transaction is straightforward and relatively well understood by consumers, merchants, and issuers.

However, although credit cards and debit cards are the most commonly used consumer payment devices at present, they may not be optimal for conducting payment transactions in ways that are becoming of greater interest to consumers. For example, consumers are growing increasingly interested in conducting payment transactions using mobile devices such as smart phones. For some of these devices the standard ways of providing account information, authentication information, or other data used to conduct a payment transaction may not be practical or desirable to use. For example, data entry using a keyboard or keypad can be difficult and prone to errors when using many mobile devices. Further, although technologies have been developed to enable greater use of mobile devices to conduct payment transactions (such as embedded chips and contactless communications methods), consumers may not be as familiar or as comfortable using these technologies as they are with a credit card or debit card-based transaction system. This may be especially prevalent in payment transactions with online merchants, small merchants, personal payments, and person-to-person ("P2P") payment transfers.

In order to increase the adoption and use by consumers of mobile payment technologies and address the interest of consumers in being able to conduct payment transactions using mobile devices, embodiments of the invention can integrate parts of a card-based transaction processing infrastructure with mobile devices in a way that does not introduce significant new hardware capability or over-the-air software provisioning as in the case of NFC technologies. Further, the methods of conducting payment transactions using these devices takes into account the capabilities and relative advantages of such devices.

Embodiments of the invention facilitate the use of mobile devices for making payments for goods and services by integrating the image capture and image processing capabilities of certain mobile devices with the existing card-based payment transaction infrastructure and processes that are familiar to consumers, merchants, and issuers. In some embodiments, a camera contained in a mobile device (such as a smart phone, generic mobile phone, or PDA) is used to capture an image of a two-dimensional barcode that is visible on the surface of a substrate (such as a consumer payment device in the form of a card, e.g., a credit card, debit card, or prepaid card). The substrate may be part of a physical payment token. The barcode may represent or otherwise encode one or more of payment account data, consumer authentication data, consumer profile data, or other relevant information. In some embodiments, the captured image may be processed by the mobile device to extract the payment account data, authentication data, or other relevant data. This data may then be communicated to a data processing element that is connected to, or forms part of, a payment processing network in order to conduct the desired payment transaction.

One embodiment of the invention is directed to a method of conducting a payment transaction comprising: capturing an image of a two-dimensional barcode on a physical payment token with a camera in a mobile device; generating barcode data based on the captured image; and transmitting the barcode data to a central server computer, wherein the central server computer initiates the payment transaction.

Another embodiment of the invention is directed to a mobile device comprising a processor; a camera coupled to the processor; and a computer readable medium coupled to the processor, the computer readable medium comprising code, executable by the processor for implementing a method comprising; capturing an image of a two-dimensional barcode on a physical payment token with the camera; generating barcode data based on the captured image, and transmitting the barcode data to a central server computer, wherein the central server computer initiates the payment transaction.

Another embodiment of the invention is directed to a method of conducting a payment transaction comprising: receiving barcode data, wherein an image of a two-dimensional barcode on a physical payment token is captured with a camera in a mobile device, and wherein the barcode data is based on the captured image; and initiating a payment transaction by the central server computer with the barcode data.

Another embodiment of the invention is directed to a server computer comprising a processor; and a computer readable medium coupled to the processor, the computer readable medium comprising code, for executing a method comprising: receiving barcode data, wherein an image of a two-dimensional barcode on a physical payment token is captured with a camera in a mobile device, and wherein the barcode data is based on the captured image; and initiating a payment transaction with the barcode data.

Further details regarding embodiments of the invention can be found in the Detailed Description and the Figures.

DETAILED DESCRIPTION

One embodiment of the invention is directed to a method of conducting a payment transaction. The method comprises capturing an image of a two-dimensional barcode on a physical payment token such as a credit card with a camera in a mobile device. After the image of the two-dimensional barcode is captured, the mobile phone can generate barcode data based on the captured image. The barcode data may be data representing an actual image of the barcode (e.g., in a JPEG file) or may be data that is encoded by the barcode. For example, with respect to the latter embodiment, the barcode data may be a PAN or primary account number that the barcode actually represents.

Once the barcode data is obtained, it may be transmitted to a central server computer. The central server computer may be in a payment processing network, or in any other suitable location.

The central server computer then initiates the payment transaction using the barcode data. As explained in detail below, the transaction may be initiated in a number of different ways. In some embodiments, the transaction may be initiated depending upon the role of the user that is associated with the barcode. For instance, in some embodiments, if the sender of funds uses his mobile device to capture the barcode associated with the sender, then the transaction may be initiated by sending the sender a dynamic account identifier, which can be input into an electronic shopping cart. If the recipient of funds is using his mobile device to capture the two-dimensional barcode associated with the sender, then the transaction may be initiated by an authorization request message to an issuer associated with an account number associated with the sender.

In some embodiments, after the barcode data is received by the server computer, the server computer may then transmit account holder data back to the mobile device. The mobile device may receive this data, and may then display the data. For example, account holder data such as a name, address, card number, etc. may be sent back to the mobile device after the mobile device scans the barcode on the physical payment token.

Prior to discussing embodiments of the invention, a further description of some terms may be helpful in understanding embodiments of the invention.

Figure 12:
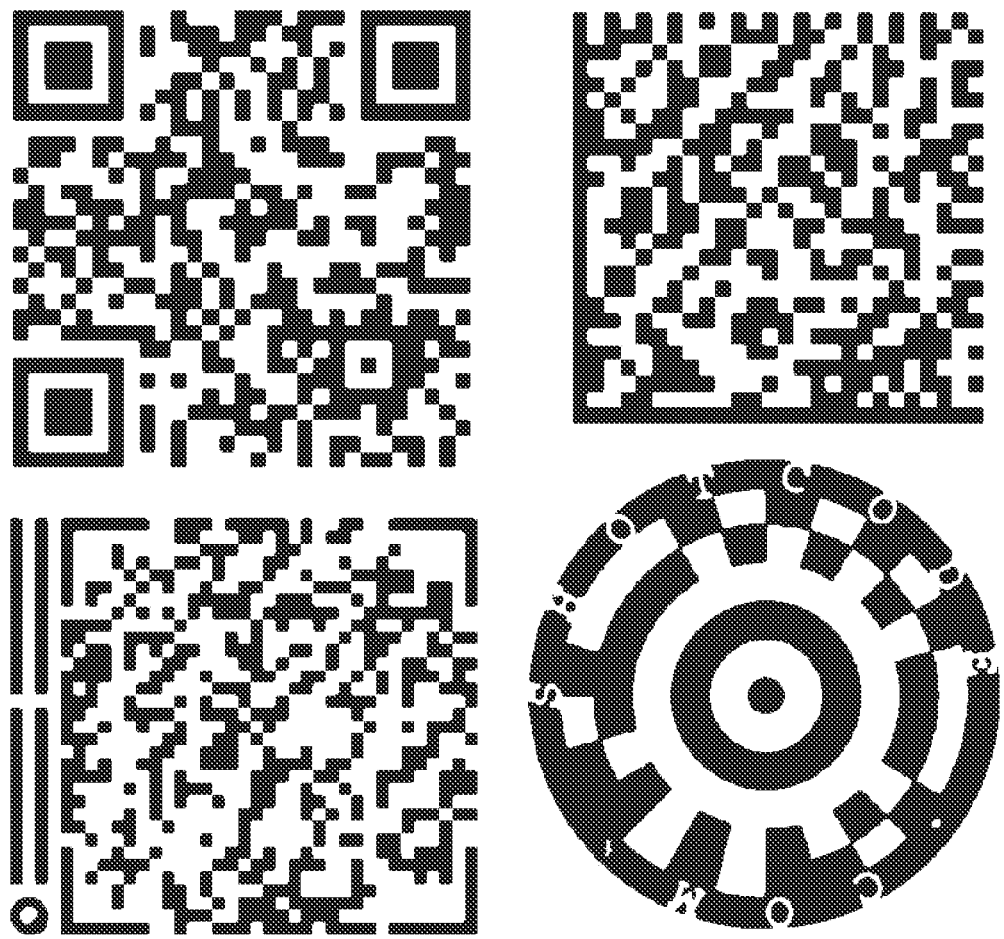
FIG. 12 shows a number of exemplary two-dimensional barcodes.

A "two-dimensional barcode" may include an optical machine-readable representation of data, which has at least two dimensions. One type of barcode is a QR CODE® (quick-response code). A QR CODE® two-dimensional code (trademark registered to Denso Corp. of Tokyo, Japan) is a printable, machine-readable code that has become widely popular with advertisers and consumers. Two-dimensional barcodes may comprise any sutiable types of patterns including rectangles, dots, hexagons, and other geometric patterns in two dimensions. Two-dimensional barcodes may also have any suitable dimensions. For example, suitable two-dimensional barcodes may have a length and/or width less than about 3 inches, 2 inches, or 1 inch. Examples of two-dimensional barcodes are shown in FIG. 12.

In some embodiments, two-dimensional barcodes may be generated using different algorithms. Unlike one dimensional barcodes (e.g., UPCs or universal product codes), the additional dimension provided by two-dimensional barcodes allows them to be encoded in different ways. For example, in embodiments of the invention, a first issuer may use a first barcode generation process that utilizes a combination or rectangles and dots to form a first issuer specific barcode. Combinations of these rectangles and dots may be used encode hundreds of different PANs for that first issuer's account holders. A second issuer may use a second barcode generation process that utilizes a combination or hexagons and dots to form a second issuer specific barcode. Combinations of these hexagons and dots may be used encode hundreds of different PANs for that second issuer's account holders.

Two-dimensional barcodes can provide additional security over traditional one-dimensional barcodes. For instance, if a payment card with a two-dimensional barcode encoding a PAN according to the first issuer specific encoding process is stolen or somehow illegally obtained, and if the first issuer specific algorithm is somehow determined by the unauthorized entity, there is no risk that the second issuer specific algorithm is compromised since the first and second issuer specific algorithms are distinct.

The two-dimensional barcodes may encode any suitable data. Such data may include data that can be present on a typical payment card. Such data may include an account number, a card verification value, an expiration date, a service code, etc. It may also encode other personal information such as an electronic communication address (e.g., a phone number, e-mail address or IP address), a physical address (e.g., home address), or personal identification information (e.g., a social security number), or preferences (e.g., a preference for aisle seats when booking an airplane ticket).

"Barcode data" may include any suitable type of data relating to a barcode. Barcode data may include data representing account holder (e.g., cardholder data) including a primary account number, a shipping address, a phone number, seating preferences, etc. The data representing the account holder that can be encoded as a barcode may be in the clear if decoded, or may be an encrypted value. For example, a real account number such as 1122334455667788 may be encoded as a two-dimensional barcode. Alternatively, an encrypted version of this number such as 1838527839287861 may be encoded as a two-dimensional barcode. Encrypted data representing the account holder provides for an extra level of security. Barcode data may also include data that represents an image of a barcode. For example, in some embodiments, barcode data may comprise a JPEG or GIF file with data that can be used to form an image of a barcode.

A "physical payment token" can include any suitable physical device that can be associated with a payment transaction. In some cases, the physical payment token may have an additional memory or computer readable storage medium which stores account holder data such as a PAN, CVV (card verification value), service code, expiration date, shipping address, and other information. Suitable physical payment tokens can be hand-held and compact so that they can fit into a consumer's wallet and/or pocket (e.g., pocket-sized). They may include smart cards, credit or debit cards (with a magnetic stripe), keychain devices (such as the Speedpass® commercially available from Exxon-Mobil Corp.), and key fobs. The physical payment tokens can be debit devices (e.g., a debit card), credit devices (e.g., a credit card), or stored value devices (e.g., a stored value card).

A "mobile device" can be any device that can allow a user to communicate with another entity. Examples of mobile devices include mobile communication devices such as phones (e.g., cellular phones, smart phones, etc.). Typically, a mobile device according to an embodiment of the invention includes a processor, a computer readable medium coupled to the processor, and a camera coupled to the processor. Further details regarding specific mobile devices are provided below.

As used herein, a "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

In some embodiments, a server computer may comprise a computer readable medium coupled to the processor. The computer readable medium comprises code, for executing a method comprising: receiving barcode data, wherein an image of a two-dimensional barcode on a physical payment token is captured with a camera in a mobile device, and wherein the barcode data is based on the captured image; and initiating a payment transaction with the barcode data.

"Account holder data" can include information about an account holder. The account holder can possess a payment card or other physical payment token that is issued by an issuer.

A "payment processing network" may include data processing subsystems, networks, and operations used to support and deliver authorization services, exception file services, and clearing and settlement services. An exemplary payment processing network may include VisaNet®. Payment processing networks such as VisaNet® are able to process credit card transactions, debit card transactions, and other types of commercial transactions. VisaNet®, in particular, includes a VIP system (Visa Integrated Payments system) which processes authorization requests and a Base II system which performs clearing and settlement services.

An "authorization request message" may include a message, or sequence of messages, that requests an issuer of a payment account to authorize a transaction. An authorization request message according to an embodiment of the invention may comply with ISO (International Organization for Standardization) 8583, which is a standard for systems that exchange electronic transactions made by cardholders using payment cards. Authorization request messages may comprise an account number, a transaction amount, a CVV (card verification value), expiration date, service code, and other information.

An "authorization response message" may refer to a message, or sequence of messages, that responds to a merchant's and/or acquirer's request to authorize a transaction. An authorization response message according to an embodiment of the invention may comply with ISO 8583, which, as described above, is a standard for systems that exchange electronic transactions made by cardholders using payment cards. Authorization response messages may comprise authorization codes for authorized transactions.

Figure 1:
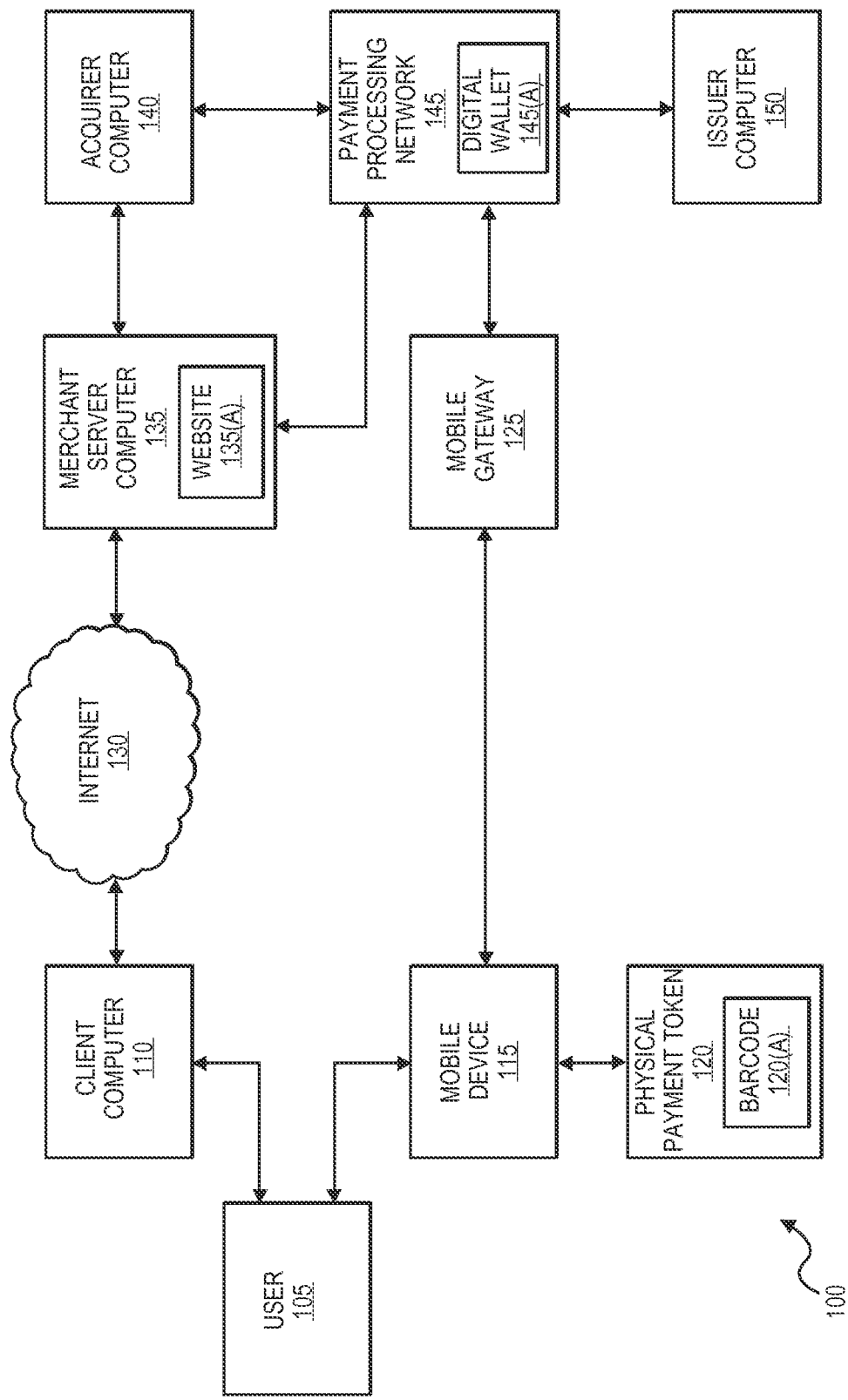
FIG. 1 shows a block diagram of a system according to an embodiment of the invention. The system can be used to conduct an online transaction with a separate client computer.

FIG. 1 shows a block diagram of a payment processing system according to an embodiment of the invention. It can be used to perform an online payment.

FIG. 1 shows a system 100 including a user 105, who can use a client computer 110 to communicate with a merchant server computer 135 via the Internet 130 or other communication medium. The merchant server computer 135 may be operatively coupled to an issuer computer 150, operated by an issuer, via an acquirer computer 140, operated by an acquirer, and a payment processing network 145. The payment processing network 145 may store a digital wallet 145(a). While the digital wallet 145(a) is shown as being within the payment processing network 145, it could be outside of the payment processing network 145 in other embodiments of the invention. The digital wallet 145(a) may contain various pieces of information of the user 105 such as account numbers associated with different issuers.

The user 105 may also use a mobile device 115 to communicate with the payment processing network 145 via a mobile gateway 125. In this embodiment, the mobile device 115 may be a mobile phone.

The user 105 may also have a physical payment token 120, which may comprise a two-dimensional barcode 120(a). The physical payment token 120 could be in the form of a payment card.

In some embodiments, the issuer operating the issuer computer 150 or the payment processing network 145 may distribute the physical payment tokens with two-dimensional barcodes prior to any transactions being conducted. Thus, if the barcodes encode encrypted primary account numbers or other sensitive information, they can be decrypted with keys residing at the issuer computer 150 or the payment processing network 145.

Methods according to embodiments of the invention can be described with reference to FIGS. 1 and 2.

In a typical purchase transaction, a user 105 can use the client computer 110 to contact the merchant Website 135(a) on the merchant server computer 135 via the Internet 130. When the user 105 finds a good or service to purchase on the Website 135(a), the user 105 can proceed to the checkout page on the merchant's Website 135(a). At the checkout page, the user 105 can be presented with a number of different payment options including a digital wallet payment option.

The digital wallet 145(a) may be programmed to maintain an association between one or more payment accounts (such as a bank account or credit card account) in a digital wallet database. Further details regarding digital wallets can be found in U.S. Patent Application No. 61/466,409 filed on Mar. 22, 2011, which is incorporated herein by reference in its entirety.

Figure 2:
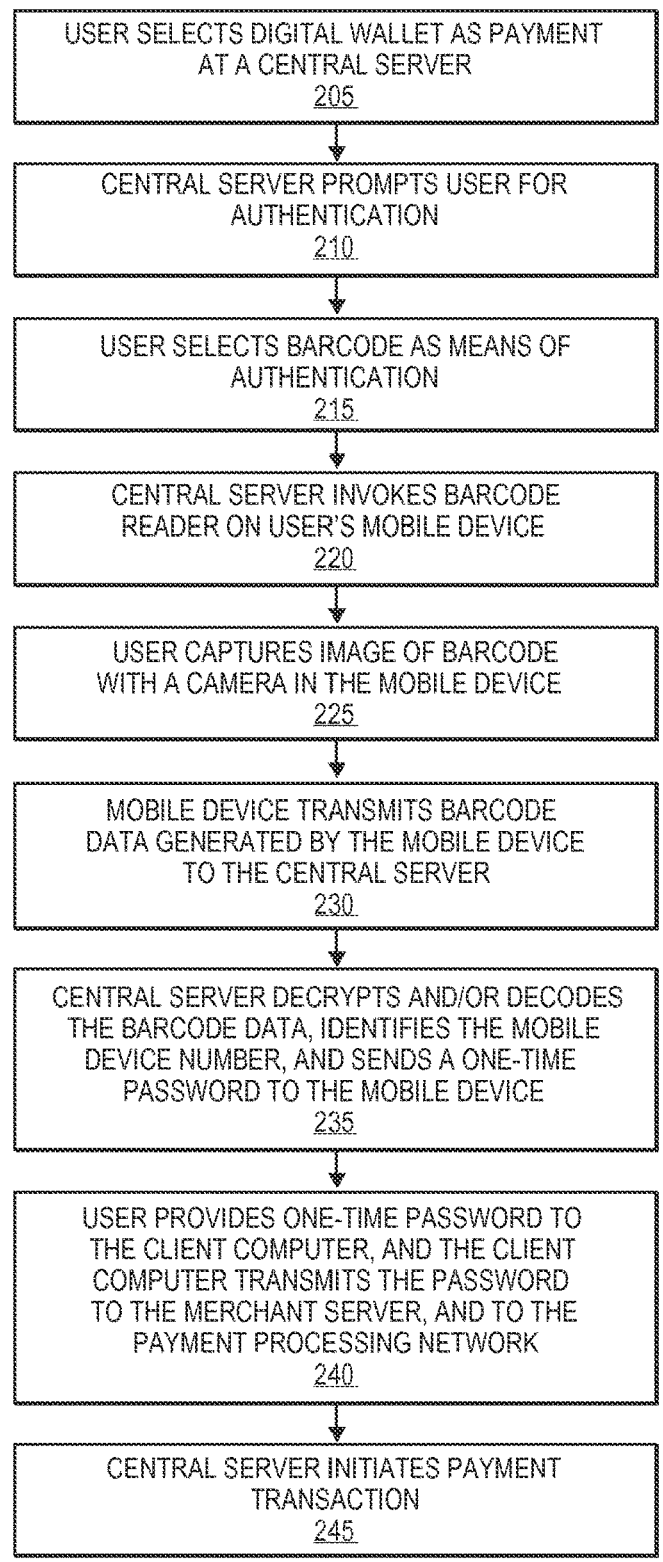
FIG. 2 shows a flowchart illustrating a method that can be used with the system in FIG. 1.

FIG. 2 shows a flowchart illustrating a method that can be used with the system in FIG. 1. The method 200 may begin at step 205 when the user 105 selects the digital wallet payment option and may access the digital wallet 145(a) via the merchant Website 135(a) by providing user credentials such as a user ID and a password. After the user 105 selects the digital wallet option, the digital wallet 145(a) may attempt to authenticate the user 105 and provide the user with a number of authentication options (step 210) including a barcode authentication option.

The user 105 may select the barcode authentication option (step 215). If the user selects the barcode authentication option, the digital wallet can invoke an application stored on the mobile device 115. This can be done by communicating with the user's mobile device 115 (step 220) via the mobile gateway 125. The digital wallet 145(a) may have previously stored the phone number (or other identifier such as an IP address) associated with the mobile device 115.

In step 225, the user 105 can use the camera on the user's mobile device 115 to capture an image of the barcode 120(a) on the physical payment token 120. The mobile device 115 may be configured to capture an image of a two-dimensional barcode 120(a) on the physical payment token 120 with a camera in the mobile device 115, generate barcode data based on the captured image, and transmit the barcode data to a central server computer such as a server computer residing in the payment processing network 145. The server computer in the payment processing network 145 can then initiate the payment transaction.

In step 230, the mobile device 115 can transmit the barcode data to the mobile gateway 125 and then to the payment processing network 145. After the barcode data is transmitted from the mobile device 115, the server computer in the payment processing network 145 can receive the barcode data. The server computer may decode the barcode data if data representing an image of the barcode is received. Alternatively, it may decrypt the data if the image of the barcode representing an encrypted value was previously decoded by the mobile device 115. In other embodiments, the server computer may receive the decoded barcode information in the clear. For instance, the mobile device 115 may decode the barcode data to generate a primary account number, and that primary account number associated with the user may be transmitted to and received by the server computer.

In step 235, once the barcode data is received by the central server computer in the payment processing network 145, the barcode data is decoded if it has not been previously decoded by the mobile device 115. Further, if the information (e.g., primary account number) associated with the barcode 120(a) was previously encrypted, the server computer may decrypt the information using an appropriate key. The decrypted and/or decoded information may include the mobile device number. In some embodiments, the mobile device number may be obtained using, for example, an account number that was obtained from the barcode data. The server computer in the payment processing network 145 may then transmit a one-time password to the mobile device 115. Alternatives to the one-time password include DCVVs (dynamic verification values) and one-time account numbers.

In step 240, the user 105 may then input the one-time password into the client computer 110 and this may be transmitted to the payment processing network 145 via the Internet 130 and the merchant server computer 135.

If the one-time password that is received at the payment processing network 145 is the same as the one that was previously generated by the payment processing network 145, then the user 105 can be authenticated, and the payment transaction may be initiated (step 245). The user 105 is authenticated, because he has provided the user ID and password to access the digital wallet 145(a), provided the correct one-time password, and was in possession of the authentic physical payment token 120 as well as the authentic mobile device 115. Embodiments of the invention are more secure than conventional card present and card not present payment processes, since multiple factors of authentication are used in embodiments of the invention.

In some embodiments, the payment processing network 145 may initiate the transaction by generating an authorization request message for the transaction. The authorization request message may be sent to the issuer computer 150. After the issuer computer 150 receives the authorization request message, the issuer computer 150 may generate and send an authorization response message to the payment processing network 145 indicating whether or not the transaction was approved. The payment processing network 145 may transmit the authorization response message to the acquirer computer 140, and then to the merchant server computer 135.

Although the transaction described herein is in the context of an online purchase transaction involving a merchant, the transaction may also be an automated teller machine (ATM) transaction or conducted in person at a physical point of sale (POS) terminal. Thus, the merchant server computer 135 as shown in FIG. 1 and described herein may alternatively be an ATM or POS terminal in other embodiments of the invention.

Figure 3:
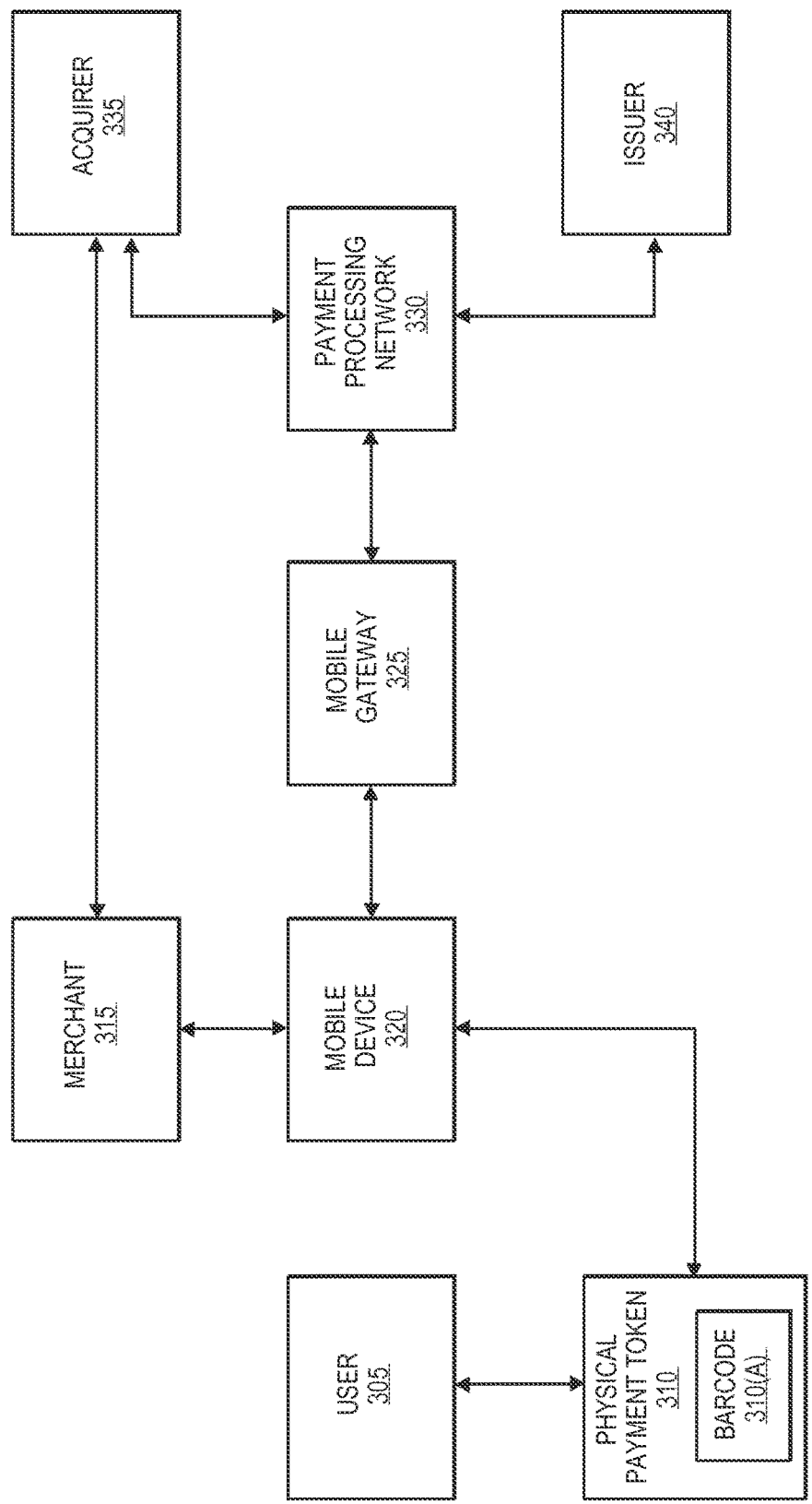
FIG. 3 shows a block diagram of a system another embodiment of the invention. The system can be used to conduct a face-to-face payment transaction.

FIG. 3 shows a block diagram of a system according to an embodiment of the invention. The system can be used for face-to-face payment transactions.

FIG. 3 shows a system 300 including a user 305 and a merchant 315.

The merchant 315 may be a mobile merchant (e.g., a food truck) or a stationary merchant. The user 105 may have a physical payment token 120 comprise a two-dimensional barcode 120(a).

The merchant 315 may operate a mobile device 320, which communicates with the payment processing network 330, an issuer computer 340, and acquirer computer 335 via a mobile gateway 125. The acquirer computer 335 may also hold an account of the merchant 315.

Figure 4:
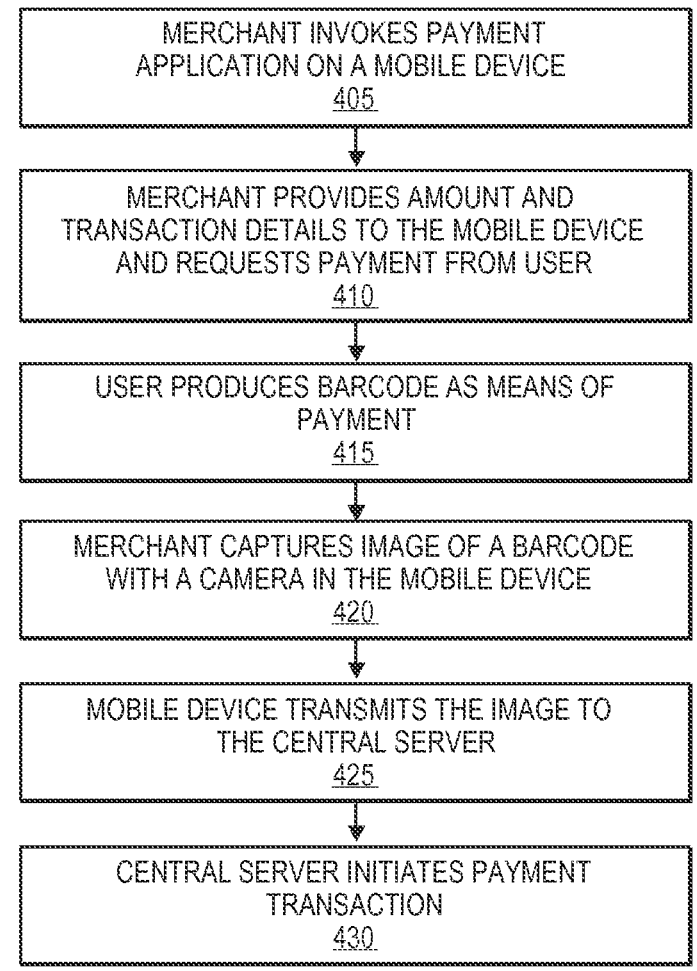
FIG. 4 shows a flowchart illustrating a method that can be used with the system in FIG. 3.

FIG. 4 shows a flowchart illustrating a method according to an embodiment of the invention. The method 400 can be described with reference to FIG. 3.

The method may begin with the user 305 selecting items for purchase at the merchant 315.

In step 405, the merchant invokes a payment application on the mobile device 320. In step 410, the merchant 315 provides the amount of the transaction and any transaction details to the mobile device 320. Other suitable transaction details may comprise descriptions of the items purchased. The merchant 315 may then request that the user 305 present the physical payment token 310 with the barcode 310(a).

At step 415, the user 315 provides a physical payment token 310 with the barcode 310(a) to the merchant 315. The physical payment token 310 may be payment card or a mobile phone. If the physical payment token 310 is in the form of a card, the two-dimensional barcode 310(a) may be imprinted on the card or may be in the form of a sticker on the card. If it is in the form of a mobile phone, then the barcode 310(a) may be shown on a screen in the mobile phone.

At step 420, the merchant captures the image of the barcode 310(a) with the camera in the mobile device 320, and the mobile device 320 generates barcode data from the barcode 310(a).

At step 425, the mobile device transmits the barcode data to a central server computer in the payment processing network 330, via the mobile gateway 325.

At step 430, the central server computer in the payment processing network 330 initiates the payment transaction.

The server computer in the payment processing network 330 may initiate the transaction by generating an authorization request message for the transaction. The server computer may either decode and/or decrypt the barcode data to determine information including a primary account number, service code, card verification value, expiration date, etc. The server computer may then format the authorization request message as described above.

Once generated, the authorization request message may be sent to the issuer computer 340. After the issuer computer 340 receives the authorization request message, the issuer computer 340 may analyze the authorization request message and may determine if the transaction is authorized or not. After this determination, the issuer computer 340 may generate and send an authorization response message to the payment processing network 330 indicating whether or not the transaction was approved. The payment processing network 330 may transmit the authorization response message to the acquirer computer 335, and then to the merchant 315. Alternatively, the payment processing network 330 may transmit the authorization response message to the mobile device 320.

At a later time, a clearing and settlement process may occur between the issuer computer 340 and the acquirer computer 335.

Figure 5:
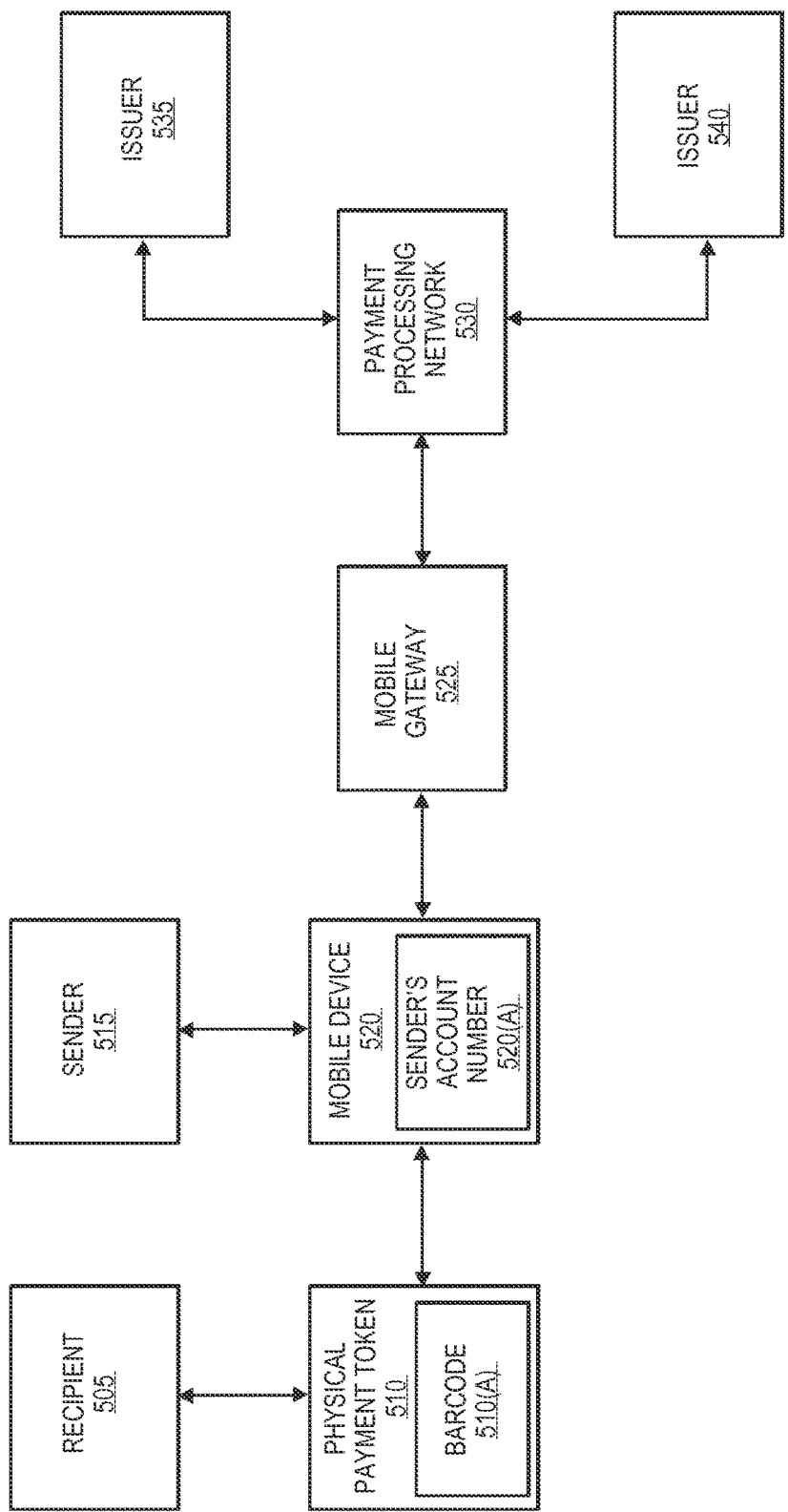
FIG. 5 shows a block diagram of a system according to another embodiment of the invention. The system can be used to implement a person-to-person ("P2P") payment transaction. The sender and recipient of the funds are face-to-face.

FIG. 5 shows a block diagram of a system according to an embodiment of the invention. The system 500 may implement a person-to-person payment transaction when the sender and recipient of the funds can be face-to-face.

FIG. 5 shows a recipient of funds 505 and a sender of funds 515 at the same location. The recipient 505 may have a physical payment token 510 with a barcode 510(a) on it. The sender 515 may have a mobile device 520, which may store the sender's account number 520(a). In other embodiments, the mobile device 520 need not store the sender's account number 520(a). For example, in other embodiments, the sender's account number may be stored at the payment processing network 530 and may be determined after the payment processing network 530 receives the mobile device 520 identifier associated with the mobile device 520. The mobile device 520 may be in operative communication with a payment processing network 530, a first issuer computer, and a second issuer computer via a mobile gateway 525. The first issuer computer may be associated a first issuer 535 that issued the account number encoded by the barcode 510(a) on the physical payment token 510. The second issuer computer may be associated with a second issuer 540 that issued the sender's account number 520(a).

Figure 6:
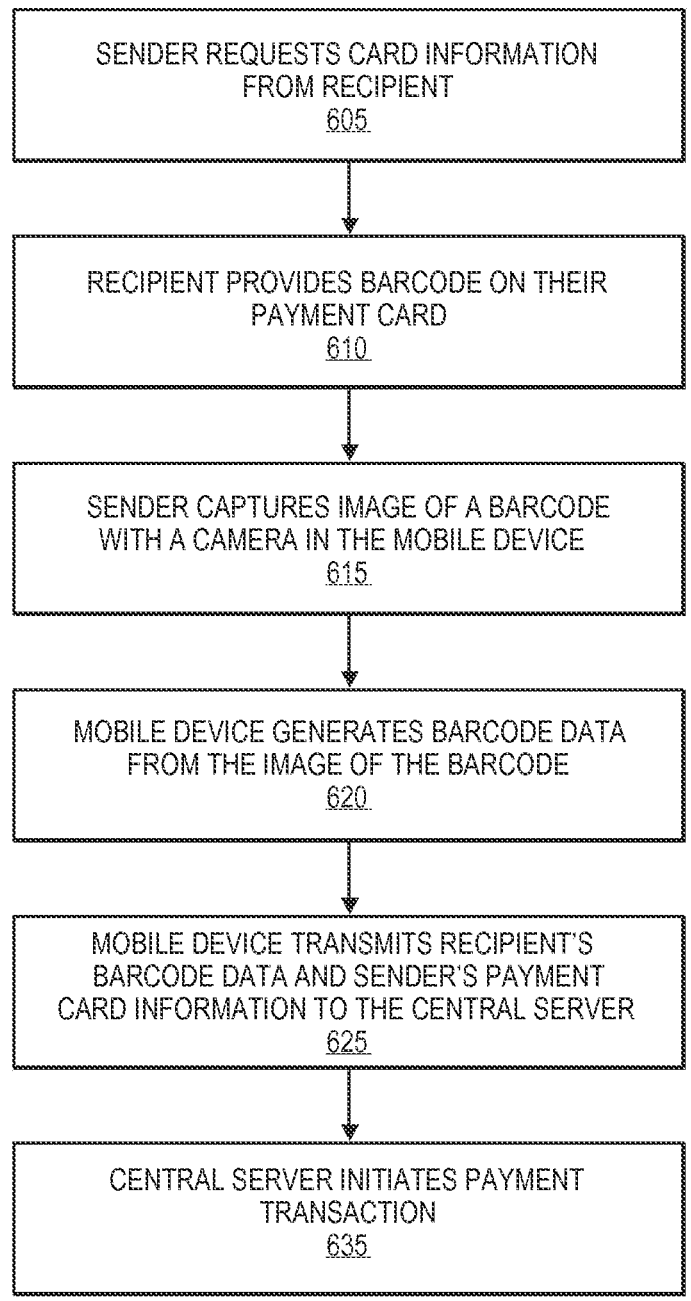
FIG. 6 shows a flowchart illustrating a method that can be used with the system in FIG. 5.

FIG. 6 shows a flow diagram of an embodiment of a typical payment transaction implemented with the system in FIG. 5.

The method 600 may begin at step 605 when the recipient 505 seeks payment from the sender 515, and requests payment card (or other form factor) information from the recipient 505.

At step 610, the recipient 505 presents his physical payment token 510 to the sender 515. As described above, the physical payment token 510 may be in the form of a card, phone, or other suitable form factor.

At step 615, the sender captures the image of a barcode 510(a) with the camera in the mobile device 520. Once captured, the mobile device 520 generates the barcode data associated with the barcode 510(a) in step 620.

At step 625, the mobile device 520 transmits the recipient's barcode data, the transaction amount, and sender's account number or a mobile device identifier to the central server computer in the payment processing network 530 via the mobile gateway 525.

At step 635, the central server computer in the payment processing network 530 initiates the payment transaction. The central server computer in the payment processing network 530 can decode and/or decrypt the barcode data if the received barcode data has not been previously decoded or decrypted. The central server computer has the sender's account number (which may be derived from the sender's mobile device identifier if the mobile device identifier and the sender's account number are stored at the payment processing network 530), the amount to be transferred from the sender's account to the recipient's account, and the recipient's account number from the barcode data.

The server computer in the payment processing network 530 may then initiate the transaction by generating appropriate payment authorization messages to the first and second issuers 535, 540 (or to their respective computers). In some embodiments, an OCT (original credit transaction) message may be sent to credit the account of the recipient 505 at the first issuer 535, while an AFT (account funding transaction) message may be sent to the second issuer 540 to debit the account of the sender 515.

An AFT (Account Funding Transaction) is a transaction designed to supply funds to another account such as a credit, prepaid, debit, ATM or on-line account. In some embodiments, the AFT message can be used to pay a service provider for sending funds to the recipient and results in a debit to the sender's account. The amount of the debit can be the amount of the credit to be delivered to the recipient plus any fees being charged by the service provider such as a transfer fee, or a currency conversion fee (if applicable).

An AFT indicator can be used in both the authorization and clearing and settlement transactions and is preceded by an authorization. Settlement can take place within two working days, or more or less than this. Neither the authorization nor the clearing transaction carries any financial information about the recipient of a money transfer. In some embodiments, the AFT carries the account number or other identifier associated with the payment account of the sender. An AFT message can also accompanied by indicators, which allow the sender's issuer to take appropriate authorization decisions. Indicators include channel information such as Mail Order/Telephone Order or Internet, etc.

The following fields can be used for an AFT and can be supported in messages and clearing and settlement transactions. The fields included in a traditional AFT message can include, but is not limited to an account number, a processing code; merchant type; CAVV result code; Mail Order/Telephone Order/Electronic Commerce Indicator; Mail/Phone/Electronic Commerce Indicator; transaction ID (XID); etc.

An OCT (Original Credit Transaction) is typically a clearing and settlement credit transaction designed for use in business applications such as a business money transfer or business-to-consumer repayments. In embodiments of the invention, the OCT can be used to deliver funds to the recipient account. It can be separate from, and can take place after, the AFT transaction. This timing can ensure that payment funds are secured before funds are sent to the recipient.

The amount of the OCT can be the amount agreed to by the sender and the service provider in the currency agreed. The OCT can carry the account number of the recipient and no information about the sender. A special indicator can identify an OCT to the recipient's issuer bank. Settlement can take place within two days, or more or less time than this.

At a later time, a clearing and settlement process may occur between the first and second issuers 535, 540 via the payment processing network 530.

Figure 7:
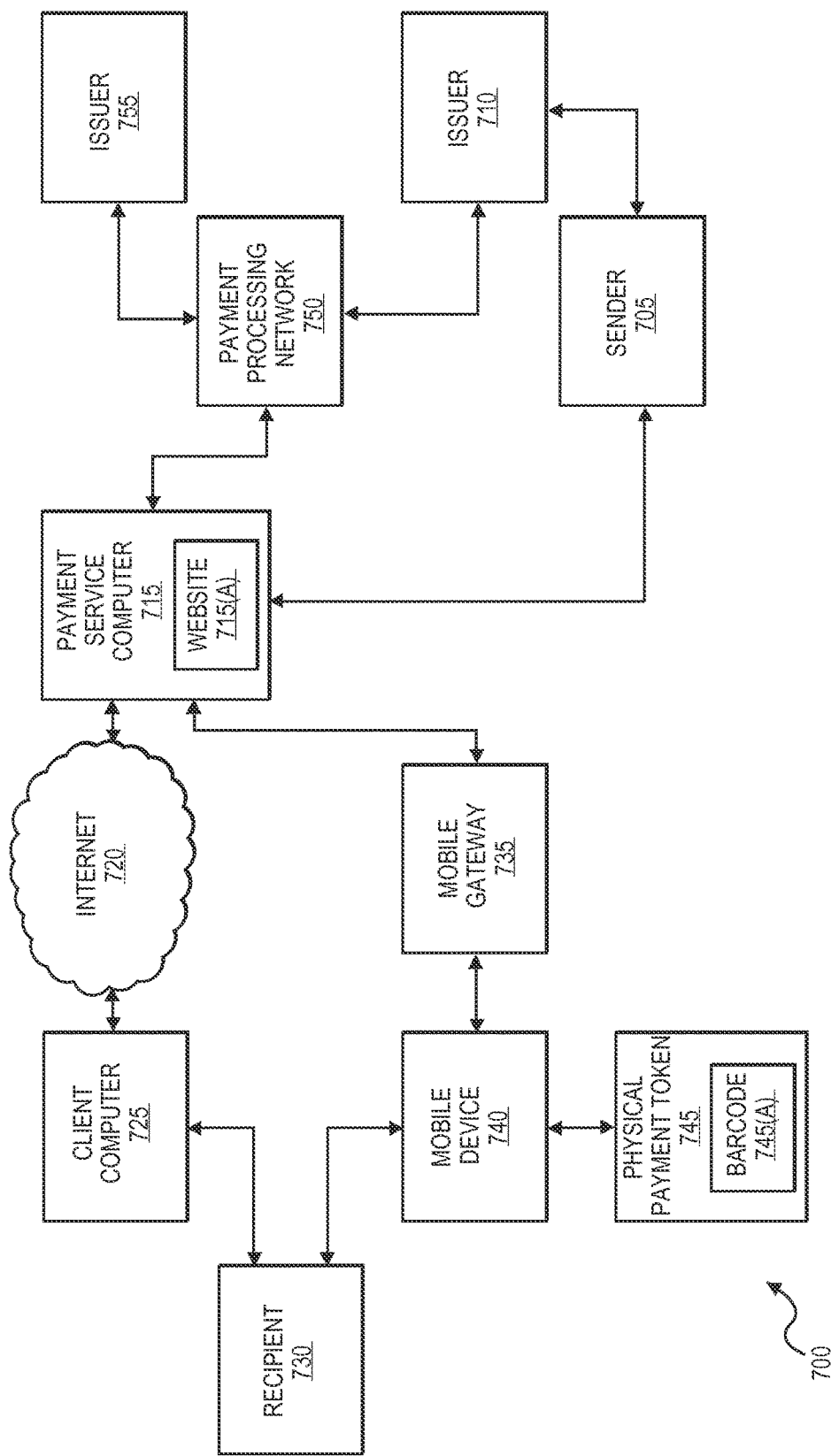
FIG. 7 shows a block diagram of a system according to an embodiment of the invention.

FIG. 7 shows a block diagram of a system according to an embodiment of the invention. It can be used to implement a person-to-person payment transaction when the sender and recipient of the funds are not face-to-face.

The system 700 includes a recipient 730, who can use a client computer 725 to communicate with a payment service computer 715 via the Internet 720 or other communication medium. The payment service computer 715 may be operatively coupled to a first issuer 755, and a second issuer 710 via a payment processing network 750.

The recipient 730 may also use a mobile device 740 to communicate with the payment service computer 715 comprising a Website 715(a) via a mobile gateway 735. The recipient 730 may also have a physical payment token 745, which may comprise a two-dimensional barcode 745(a).

The sender 705 may also communicate with the payment service computer 715 (by operating a client computer, not shown), and may have relationship with the issuer operating the issuer computer 710.

Figure 8:
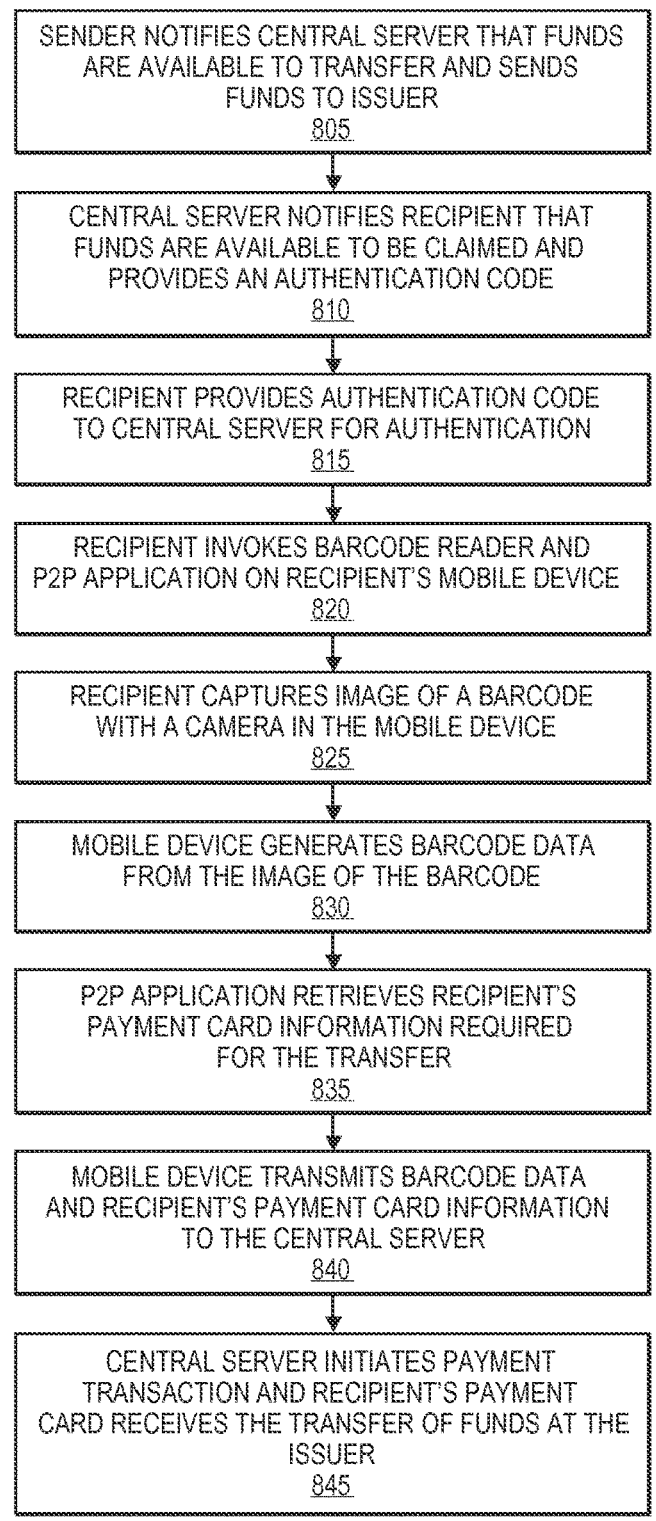
FIG. 8 shows a flowchart illustrating a method that can be used with the system in FIG. 7.

FIG. 8 shows a flowchart illustrating a method that can be described with reference to the system in FIG. 7.

The method 800 may begin at step 805 when a sender 705 wants to transfer funds to the recipient 730.

At step 810, the payment service computer 715 can notify the recipient 730 at his mobile device 740 via the mobile gateway 735 that funds are available to be claimed and provides the recipient 730 with a claim code. The notification could be in the form of a text message or an e-mail.

At step 815, the recipient 730 may contact a Website 715(a) operated by the payment service computer 715 using the client computer 725. Once on the Website 715(a), the recipient 730 may provide the claim code to the payment service computer 715. The Website 715(a) may then provide a screen requesting that the recipient 730 to choose a mode of entering his payment card information (e.g., for receiving the transfer of funds).

At step 820, the recipient 730 may choose to enter his payment card information by using a barcode, and invoke the person-to-person ("P2P") payment application on the mobile device 740. Then, at step 825, the recipient 730 can capture an image of the barcode 745(a) with a camera in the mobile device 740.

At step 830, the mobile device 740 generates barcode data from the image of the barcode 745(a). At step 835, the P2P application may retrieve the recipient's payment card (or other form factor) information required for the transfer.

At step 840, the mobile device 740 transmits the barcode data to the payment service computer 715, which transmits it to the payment processing network 750. As described above, the barcode data may be decoded if it the barcode has not previously been decoded. The barcode data may also be decrypted if the barcode previously represented an encrypted value.

At step 845, the payment processing network 750 initiates the payment transaction. The server computer in the payment processing network 750 has the account number of the recipient 730, the account number of the sender 705, and the amount to be transferred from the sender 705 to the recipient.

The server computer in the payment processing network 750 may initiate the transaction by generating and sending appropriate payment instruction messages to the first and second issuers 755, 710 (or to their respective computers). In some embodiments, an OCT (original credit transaction) message may be sent to credit the account of the recipient 730 at the first issuer 755, while an AFT (account funding transaction) message may be sent to the second issuer 710 to debit the account of the sender 705. AFT and OCT transactions and message are described above, and need not be repeated here.

Figure 9:
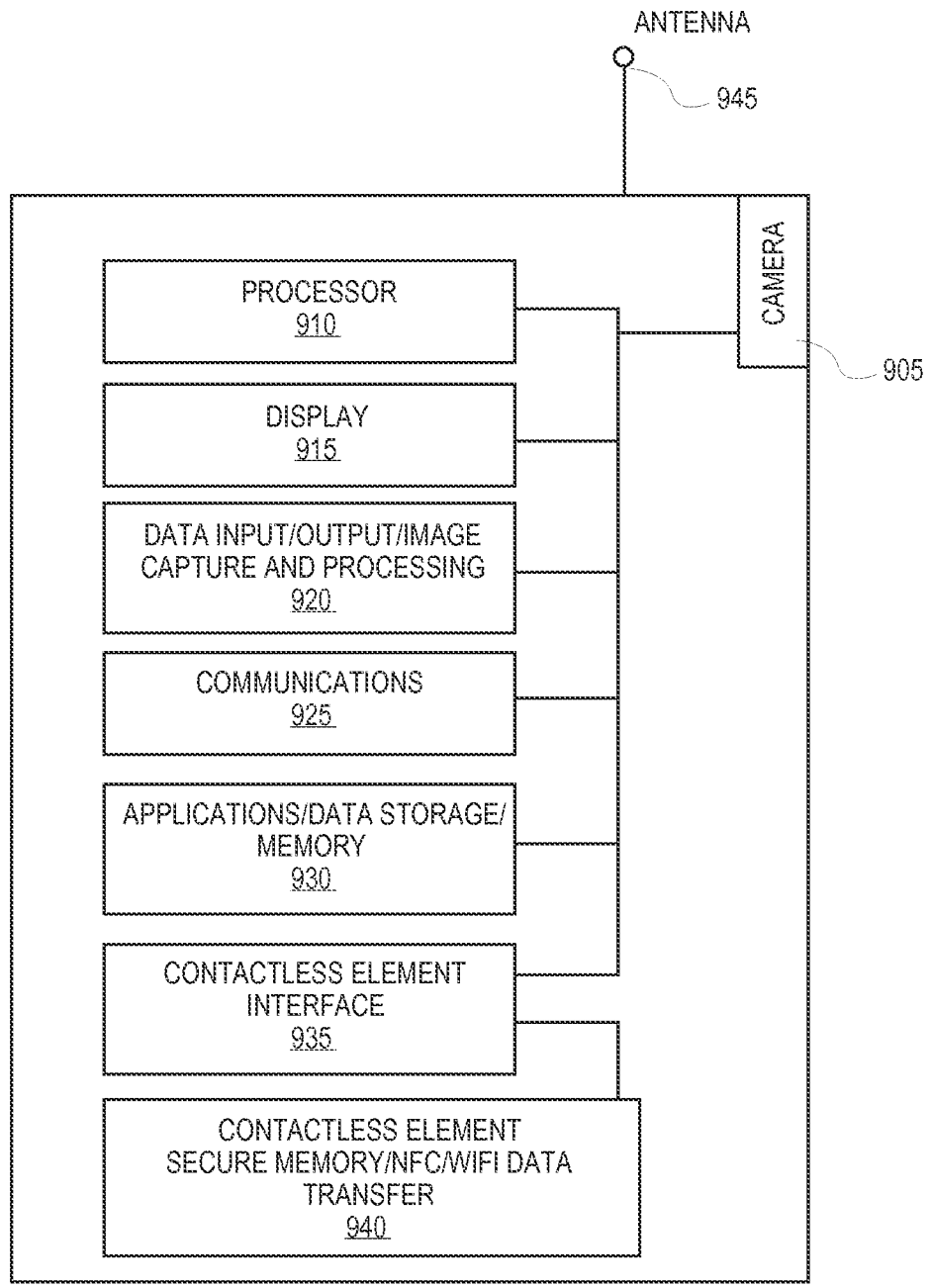
FIG. 9 is a block diagram illustrating certain elements of a mobile device that may be used to implement an embodiment of the invention.

FIG. 9 is a block diagram illustrating certain elements of a mobile device that may be used to implement an embodiment of the invention. As shown, the mobile device 900 may include a processor 910 or processing element that executes instructions or code in order to implement functions, operations, methods, or processes. The mobile device may also include a camera 905 (or other form of image capture element), a display 915, data input means 920 (a keypad, touch screen, track ball), data output means (the display, a speaker), image capture and processing capabilities, communications elements 925 to enable the exchange of messages, signals, and data between the mobile device and a cellular network or POS terminal, a set of instructions or code for executing one or more applications (for initiating a payment transaction, processing an image, etc.) and/or data stored in a memory 930, a contactless element interface 935 (if applicable), a contactless element 940 (which may include a secure data storage element and a data transfer element) and an antenna 945 for transmitting data, signals, or other information from the mobile device.

The memory 930 may comprise a computer readable medium comprising code, executable by the processor 910 for implementing a method comprising; capturing an image of a two-dimensional barcode on a physical payment token with the camera; generating barcode data based on the captured image, and transmitting the barcode data to a central server computer. The memory 930 may also store encryption keys for decrypting any encrypted values that are decoded from the barcodes being scanned.

Figure 10A:
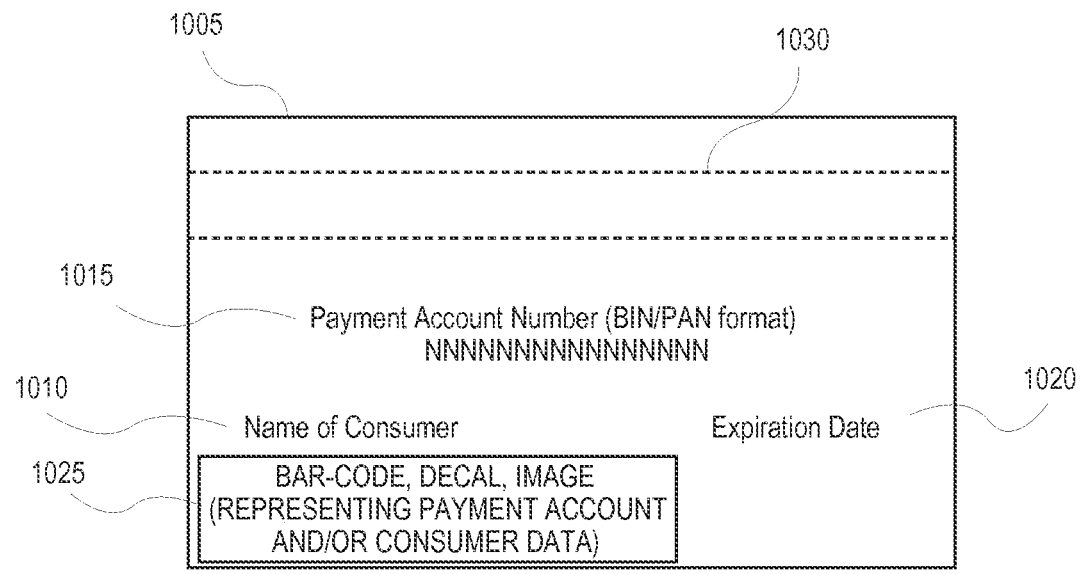
FIG. 10(a) shows a drawing of a payment card with a barcode on it.
Figure 10B:
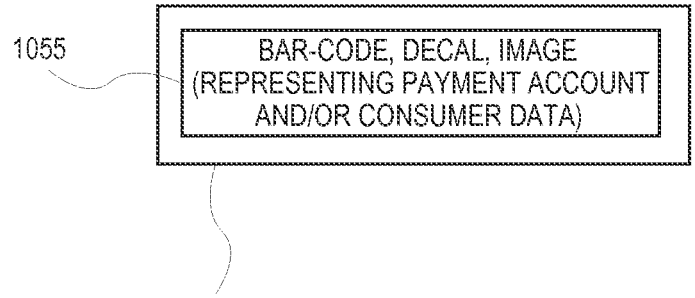
FIG. 10(b) shows a block diagram of a consumer payment device that includes a barcode or decal representing information that may be used in conducting a payment transaction using an embodiment of the invention.

FIG. 10(a) is a diagram illustrating an example of a physical payment token device that includes a barcode or decal representing information that may be used in conducting a payment transaction using an embodiment of the invention, and FIG. 10(b) is a diagram illustrating another format in which the barcode or decal may be provided.

As shown in FIG. 10(a), a physical payment token 1005 may take the form of a card or substrate (e.g., a credit card, debit card, or prepaid card) having a front side or surface on which contains embossed or printed information. The information may include the consumer name 1010, the payment account number 1015 (typically in a standard form that includes an identification of a BIN and PAN), an expiration date of the payment device 1020, and an image, barcode, or decal 1025 that represents or otherwise encodes data or information relevant to conducting a payment transaction (such as the payment account number, the consumer authentication data, like a PIN, and other data that may be relevant to conducting a payment transaction). The information may also include a signature panel and CVV2 square. The back side or surface may include a magnetic stripe 1030 in which is encoded payment account and other data. Other new information and non-payment information may be contained on the physical payment token 1005 as well. In an embodiment, information from the front of the card or the back of the card can be printed or embossed on the back of the card or the front of the card, respectively.

As shown in FIG. 10(b), a physical payment token 1050 may include the image, barcode, or decal 1055 that represents or otherwise encodes data or information relevant to conducting the payment transaction may also be provided in another format, such as placed on a different type of substrate (e.g., a card, paper, stamp, key fob, etc.).

The various participants and elements described herein may operate one or more computer apparatuses to facilitate the functions described herein. Any of the elements in the above-described Figures, including any servers or databases, may use any suitable number of subsystems to facilitate the functions described herein.

Figure 11:
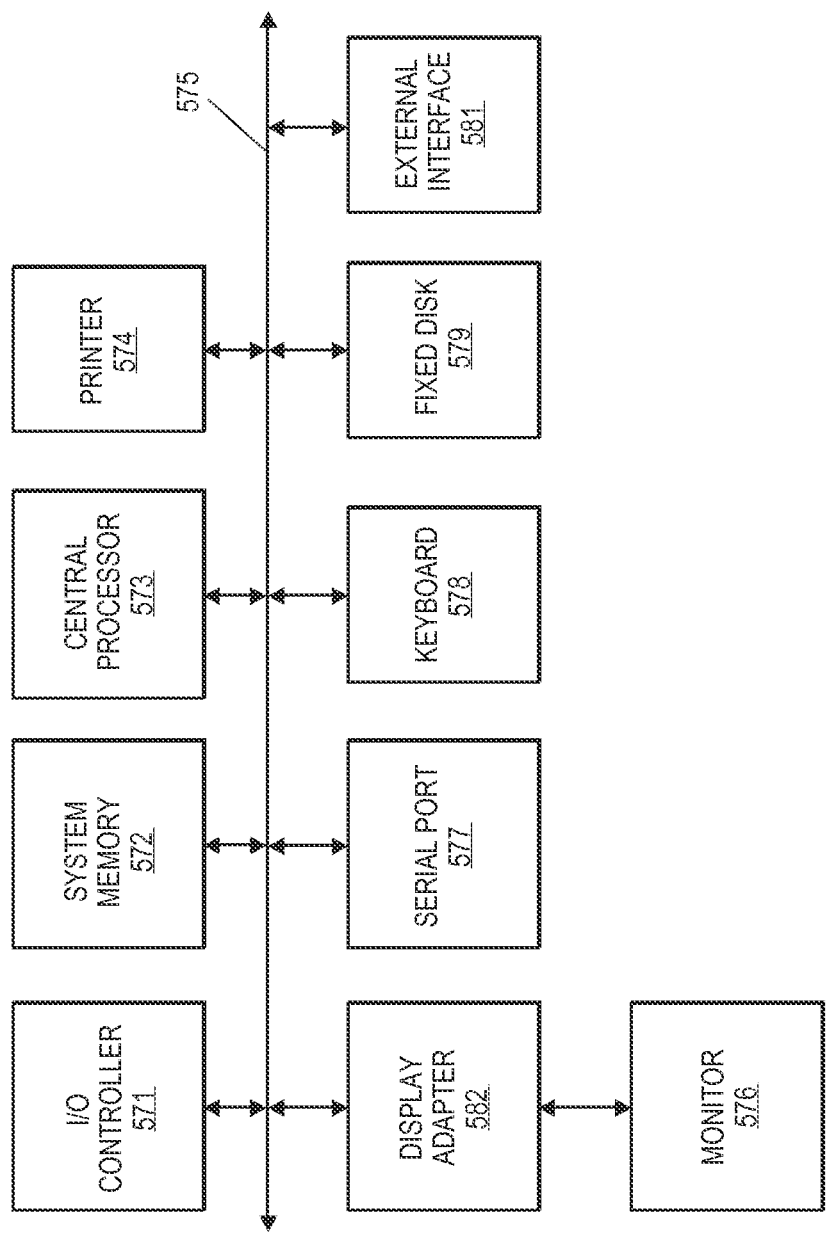
FIG. 11 shows a block diagram illustrating elements of a system that may be operated to implement an embodiment of the invention.

FIG. 11 is a block diagram of elements that may be present in a computing device or system configured to execute a method, process, function, or operation in accordance with some embodiments of the invention. The subsystems shown in FIG. 11 are interconnected via a system bus 575. Additional subsystems such as a printer 574, a keyboard 578, a fixed disk 579, a monitor 576, which is coupled to a display adapter 582, and others are shown. Peripherals and input/output (I/O) devices, which couple to an I/O controller 571, can be connected to the computing system by any number of means known in the art, such as a serial port 577. For example, the serial port 577 or an external interface 581 can be used to connect the computing device to a wide area network such as the Internet, a mouse input device, or a scanner. The interconnection via the system bus 575 allows a programmed central processor 573 (e.g., a microprocessor, CPU, etc.) to communicate with each subsystem and to control the execution of instructions that may be stored in a system memory 572 or the fixed disk 579, as well as the exchange of information between subsystems. The system memory 572 and/or the fixed disk 579 may embody a computer-readable medium.

A number of advantages of embodiments of the invention are described above. Other advantages also exist. For example, because payment card or account information does not reside in a digital wallet or in the "cloud," it is difficult for an unauthorized person to steal the payment card or account number by hacking computer systems that might otherwise store this information. As noted above, the payment card and account information can be stored in a two-dimensional barcode on a physical payment token. The consumer has the convenience of a digital wallet, without having to enter in card information, for example, into a computer during an online transaction.

As described, the inventive service may involve implementing one or more functions, processes, operations or method steps. In some embodiments, the functions, processes, operations or method steps may be implemented as a result of the execution of a set of instructions or software code by a suitably programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art. For example, although the scanning of barcodes on physical payment devices is described in detail for the purpose of inputting payment account information into a payment system, embodiments of the invention can also be used for other purposes. For example, a physical payment token may include other information such as a shipping address, home address, preferences, family status, etc., and this information may be decoded and/or decrypted by a mobile device, and subsequently used in a transaction. In some cases, this information can be used to automatically form fill information on a Web page or other interface operated by a payment recipient (e.g., a merchant).

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a", "an" or "the" is intended to mean "at least one", unless specifically indicated to the contrary.

What is claimed is:

1. A method comprising:
   capturing, by a mobile device, an image of a two-dimensional barcode on a physical payment token with a camera in the mobile device in a transaction;
   generating, by the mobile device, barcode data from the image of the two-dimensional barcode; and
   transmitting, by the mobile device, the barcode data to a server computer, wherein the server computer generates and transmits an original credit transaction message to a first issuer computer to credit a first account for the transaction, and wherein the server computer generates and transmits an account funding transaction message to a second issuer computer to debit a second account for the transaction.

2. The method of claim 1, wherein the first account is held by a recipient of funds associated with the transaction, and the second account is held by a sender of the funds associated with the transaction.

3. The method of claim 1, wherein the mobile device is a mobile phone.

4. The method of claim 1, wherein the physical payment token is in a form of a card.

5. The method of claim 1, wherein the original credit transaction message comprises an OCT indicator and a transaction amount.

6. The method of claim 1, wherein the account funding transaction message comprises an AFT indicator and a transaction amount.

7. The method of claim 1, wherein the mobile device comprises a processor coupled to the camera.

8. A mobile device comprising:
   a processor;
   a camera coupled to the processor; and
   a non-transitory computer readable medium comprising code, executable by the processor to implement a method comprising:
   capturing an image of a two-dimensional barcode on a physical payment token with the camera in the mobile device in a transaction;
   generating barcode data from the image of the two-dimensional barcode; and
   transmitting the barcode data to a server computer, wherein the server computer generates and transmits an original credit transaction message to a first issuer computer to credit a first account for the transaction, and wherein the server computer generates and transmits an account funding transaction message to a second issuer computer to debit a second account for the transaction.

9. The mobile device of claim 8, wherein the first account is held by a recipient of funds associated with the transaction, and the second account is held by a sender of the funds associated with the transaction.

10. The mobile device of claim 8, wherein the mobile device is a mobile phone.

11. The mobile device of claim 8, wherein the physical payment token is in a form of a card.

12. The mobile device of claim 8, wherein the method further comprises:
   encrypting the barcode data and wherein the transmitted barcode data is encrypted barcode data.

13. A method comprising:
   receiving, by a server computer, from a mobile device, barcode data, wherein the barcode data was generated by the mobile device after the mobile device captures an image of a two-dimensional barcode on a physical payment device;
   generating and transmitting, by the server computer, an original credit transaction message to a first issuer computer to credit a first account for a transaction; and
   generating and transmitting, by the server computer, an account funding transaction message to a second issuer computer to debit a second account for the transaction.

14. The method of claim 13, wherein the server computer is in a payment processing network.

15. The method of claim 13, wherein the mobile device is a mobile phone.

16. The method of claim 13, wherein the original credit transaction message comprises an OCT indicator and a transaction amount.

17. The method of claim 13, wherein the account funding transaction message comprises an AFT indicator and a transaction amount.

18. The method of claim 13, wherein the physical payment device is in a form of a card.

19. The method of claim 13, wherein the first account is held by a recipient of funds associated with the transaction, and the second account is held by a sender of the funds associated with the transaction.

20. The method of claim 13, wherein the barcode data is encrypted when received by the server computer and wherein the method comprises decrypting the encrypted barcode data.

* * * * *